United States Patent

[11] 3,594,738

[72] Inventor Paul R. Callens
Cagnes S/Mer (var), France
[21] Appl. No. 809,204
[22] Filed Mar. 21, 1969
[45] Patented July 20, 1971
[73] Assignee I. E. R. Impression Enregistrement Des Resultats
Paris, France
[32] Priority Mar. 22, 1968
[33] France
[31] 145,039

[54] DELAYING READ SIGNAL AS A FUNCTION OF INFORMATIONAL CONTENT
6 Claims, 6 Drawing Figs.

[52] U.S. Cl. 340/174.1 H, 340/174.1 A
[51] Int. Cl. G11b 5/04, G11b 5/44
[50] Field of Search 340/174.1 A, 174.1 B, 174.1 G, 174.1 H

[56] References Cited
UNITED STATES PATENTS

| | | | |
|---|---|---|---|
| 3,243,580 | 3/1966 | Welsh | 340/174.1 |
| 3,271,750 | 9/1966 | Padalino | 340/174.1 |
| 3,404,391 | 10/1968 | Chor | 340/174.1 |
| 3,491,349 | 1/1970 | Sevilla et al. | 340/174.1 |

*Primary Examiner*—Bernard Konick
*Assistant Examiner*—Vincent P. Canney
*Attorney*—Woodhams, Blanchard and Flynn

ABSTRACT: Generation of a clock signal by subjecting the read signal to a fixed delay of less than three-fourths of the bit period, preferrably five-eighths of a bit period, in the absence of a midbit transition and subjecting the read signal to a fixed delay of approximately seven-eighths of a bit period upon the occurrence of a midbit transition.

INVENTOR
PAUL R. CALLENS
BY
Woodhams, Blanchard & Flynn
ATTORNEYS

PATENTED JUL 20 1971 3,594,738

INVENTOR
PAUL R. CALLENS

BY
Woodhams, Blanchard and Flynn
ATTORNEYS

INVENTOR
PAUL R. CALLENS
BY
Woodhams, Blanchard & Flynn
ATTORNEYS

INVENTOR
PAUL R. CALLENS
BY Woodhams, Blanchard & Flynn
ATTORNEYS

INVENTOR
PAUL R. CALLENS
BY Woodhams, Blanchard & Flynn
ATTORNEYS

INVENTOR
PAUL R. CALLENS
BY Woodhams, Blanchard & Flynn
ATTORNEYS

DELAYING READ SIGNAL AS A FUNCTION OF INFORMATIONAL CONTENT

The present invention relates to a method of regeneration of the clock signal in systems for recording numerical information signals on a moving magnetic medium such as a magnetic tape, disc or card and also relates to recording systems which entail the application of said method. The invention also applies solely to recording systems which utilize a recording code of the "self-synchronizing" type, that is to say a code which makes it possible to regenerate the clock signal from the reading signal.

In the magnetic recording of numerical information, said information is transmitted to the recording head in the form of a signal known as a "recording signal" which consists in the majority of cases of an electric recording current. Said recording signal produces within the airgap of the recording head a magnetic field of sufficient intensity to produce permanent magnetic dipoles on the moving magnetic medium.

At the time of reading, the displacement of said dipoles in front of the magnetic reading head produces within the airgap of said head a succession of magnetic-field variations. These field variations in turn produce an electric signal or so-called "reading signal" in relation to the distribution of the magnetic field produced by the dipoles and the displacement of these latter.

The relation which exists between the values of the recording signal and the information proper is defined by a code which is referred to as a "recording code." As stated in the foregoing, the invention applies only to self-synchronizing recording codes which have the property of permitting regeneration of the so-called "clock signal" from the reading signal, thereby defining the time intervals T in which the numerical information is located. This time interval T is known as an "information interval." . Moreover, all these codes have at least one "transition" per information interval.

Two self-synchronizing codes are at present employed for the purpose of recording numerical information: the two-phase code and the two-frequency code, that is to say binary codes having two states. However, the reading signal obtained by means of recording methods which make use of these two codes exhibits phase distortions with respect to the recording signal. The most marked distortion takes place when the information is such that the number of transitions per information interval changes from two transitions per interval to one transition per interval or conversely. The resultant phase distortion gives rise to the fact that the transitions which permit regeneration of the clock signal and which are located at the center of each information interval are displaced by one quarter of the value of the information interval either earlier or later in time depending on whether the changeover takes place from two transitions per interval to one transition per interval or conversely.

It follows from the foregoing that the phase of the regenerated clock signal is not stationary and that, in consequence, the time intervals in which the numerical information is located are not defined with accuracy, thereby increasing the probability of error in the decoding of said information.

It has therefore been sought to correct the phase-displacements referred-to by effecting an analog compensation on the reading signal by means of filters. Unfortunately, filters which would theoretically be capable of carrying out said analog compensation are not physically workable so that the compensation can only be partial. Furthermore, filters always exhibit drift and their characteristic is dependent on the utilization frequency.

The main object of the present invention is to circumvent the disadvantages mentioned above by providing a method which makes it possible to regenerate a stationary-phase clock signal without analog compensation.

With this objective, the invention is directed to a method of regeneration of a clock signal which essentially consists in subjecting the reading signal to a time-delay equal to $\tau$ when there is no transition at the center of the information interval whose duration is T and a time-delay equal to $\tau+T/4$ when there is a transition at the center of the information interval, $\tau$ being smaller than $3T/4$ and preferably equal to $5T/8$.

Thus, the transitions which permit regeneration of the clock signal are all in equidistant relation, with the result that the phase of the regenerated clock signal is stationary, irrespective of variations of the information.

A recording system of the above-mentioned type which entails the application of said method is essentially provided with a device for regenerating the clock signal. Said device comprises in combination a differentiator to which the amplified and clipped reading signal is applied at the input, said differentiator being connected in series with a pulse rectifying and shaping circuit which delivers a calibrated pulse in respect of each transition of the reading signal. The output of said circuit is connected on the one hand to the input of a first monostable multivibrator having a width equal to $5T/8$ and on the other hand to one of the inputs of an AND gate which receives at its other input the output signal of the first monostable multivibrator. Said AND gate feeds a second monostable multivibrator having a width $3T/8$ and the output signals of the two monostable multivibrators are respectively applied to the two inputs of a NOR logic circuit which supplies an oscillator for generating the clock signal.

The two monostable multivibrators are advantageously combined in a single monostable device having a variable width, the output of said device being coupled directly with the oscillator which generates the clock signal.

This form of construction of the regenerating device is more compact and therefore less costly.

Preferably, the variable-width monostable device is replaced by a scaling circuit to which are applied clock pulses of predetermined frequency delivered by a separate oscillator.

Any possible drift in the widths of the monostable device is thus avoided.

A clear understanding of the invention will in any case be gained from the following description, reference being made to the accompanying drawings which illustrate a number of embodiments given by way of nonlimitative example, and in which.

Figure 1:
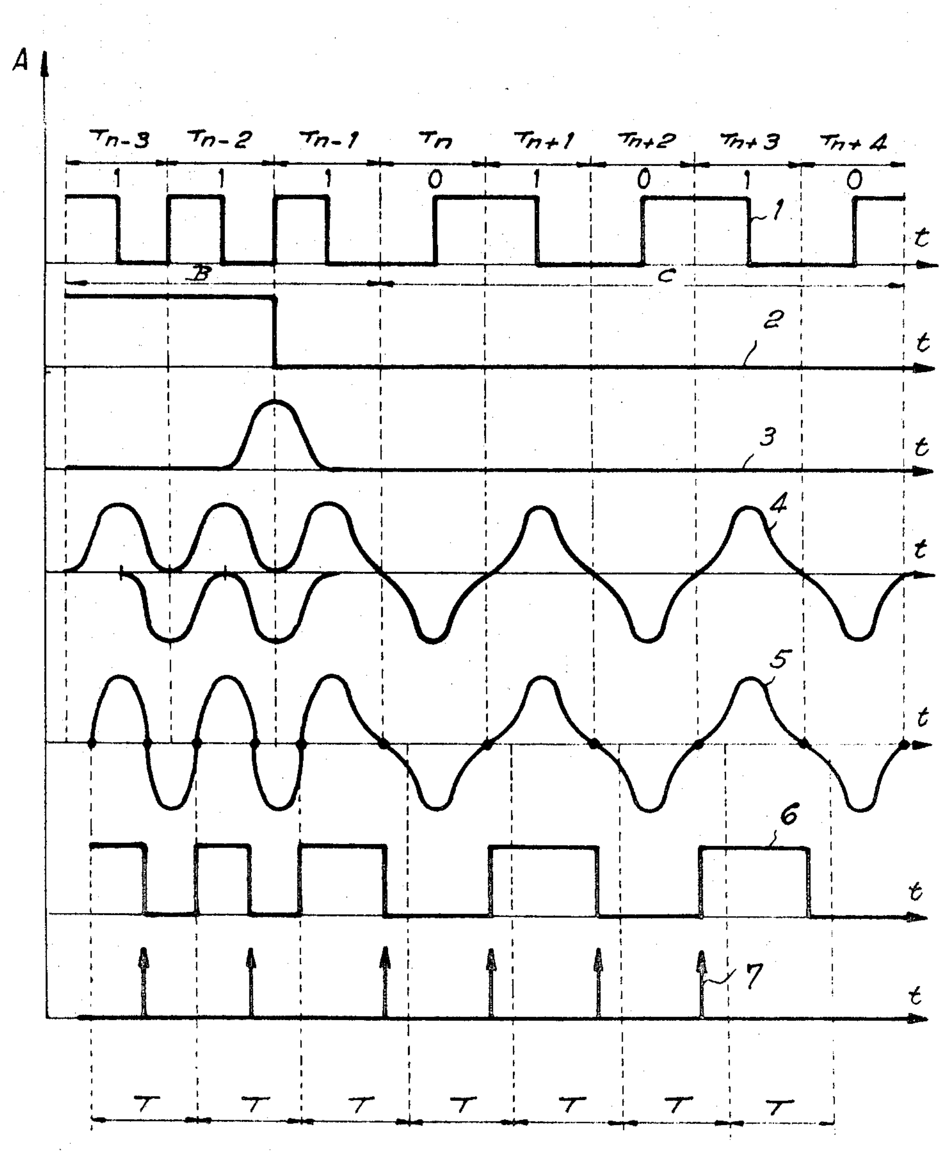
FIG. 1 is a diagram of signals which illustrate the process of phase distortion of the reading signal in the case of a two-phase recording code.
Figure 2:
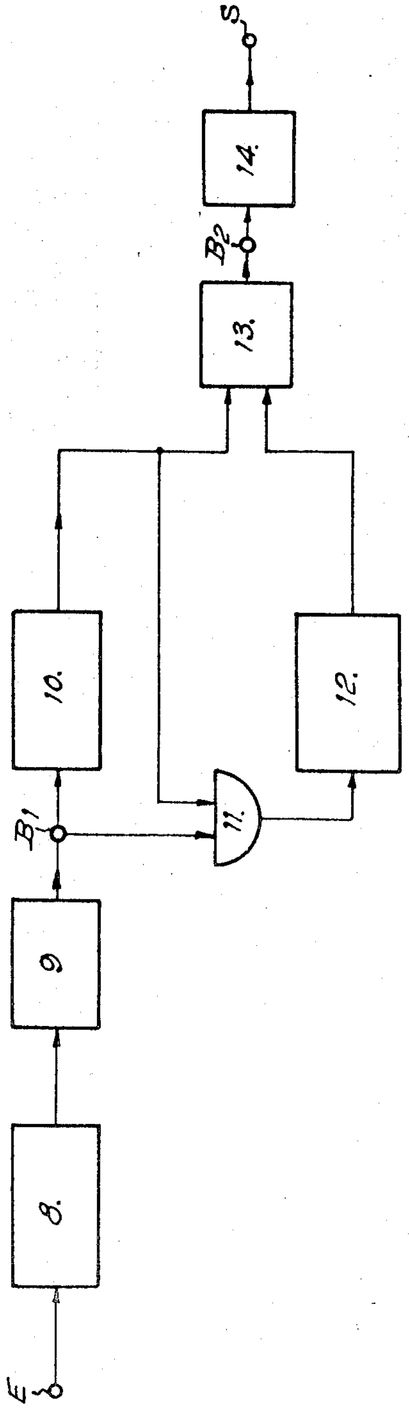
FIG. 2 is a block diagram of one embodiment of a device for regenerating a clock signal in accordance with the present invention.

Referring to the signal diagram of FIG. 1, the process of phase distortion of the reading signal will first be explained in the case in which the recording signal changes from a configuration comprising two transitions per information interval to one configuration comprising a single transition per information interval. In this figure, as well as in the following figures, the different signals are plotted as a function of the time $t$ and of their amplitude A.

The signal 1 represents a portion of recording signal having successively the two configurations mentioned above: Configuration B comprising two transitions per interval extends over the information intervals $T_{n13}$, $T_{n12}$ and $T_{1}$, whilst configuration C comprising one transition per interval extends over the information intervals $T_n$, $T_{n+1}$, $T_{n+2}$, $T_{n+3}$, $T_{n+4}$. The self-synchronizing recording code employed in this example is the two-phase code but the demonstration would be identical in the case of a two-frequency code. Configuration B corresponds, for example to a series of binary "1" whereas configuration C corresponds to a series of binary "1" and "0." According to the two-phase code which is employed, the binary "0" ($T_n$, $T_{n+2}$, $T_{n+4}$) is represented by a square-signal period in opposite phase with respect to the square-signal period which represents the binary "1" ($T_{n1}3$, $T_{n12}$, $T_{n11}$, $T_{n+1}$, $T_{n+3}$. The transitions which permit regeneration of the clock signal are the transitions which are located at the center of each information interval T.

There is shown at 2 a magnetic-field unit step which is produced within the airgap of the reading head and at 3 the response of the head to said unit step 2. However, it will be noted that the exact form of the response does not play any part in the reasoning.

The signal which is represented at 4 shows the superpositon within the reading head of the responses to the magnetic-field unit steps produced by the dipoles which are recorded on the moving magnetic medium. So far as the signal represented at 5 is concerned, said signal gives the shape of the reading signal which is collected at the terminals of the reading head.

The signal 6 represents the binary signal which is obtained after amplification and clipping of the reading signal 5 and the clock pulses which are deduced directly from the transitions of the signal 6 are shown at 7.

As can be noted from the figure, the phase of said clock signal 7 is not stationary. In fact, the clock pulses which correspond to configuration C of the recording signal 1 as well as the pulse which corresponds to the preceding information interval, namely the interval $T_{n11}$, are all displaced by one-fourth of the value of the information interval T with respect to the clock pulses which correspond to configuration B. In this instance, the displacement consists of a phase lag which has a value corresponding to one-fourth of the time interval T.

Since the phase of the clock signal 7 which is regenerated from the reading signal 5 is not stationary, the time intervals T in which the numerical information is located are not defined with precision, thereby increasing the probability of error in the decoding of said information. This state of affairs can be improved by providing for analog compensation on the reading signal by means of filters. However, as stated in the foregoing, the analog compensation is only partial and does not prove wholly satisfactory.

With reference to FIG. 1, there will now be described a device according to the invention whereby a stationary-phase clock signal can be regenerated from the reading signal under all circumstances. Said device comprises in the first place an input terminal E to which the reading signal is applied after amplification and clipping, that is to say a signal of the type shown at 6 in FIG. 1. This input terminal E is connected directly to a differentiating circuit 8 in series with a pulse rectifying and shaping circuit 9, the output of which is connected to a terminal $B_1$. The terminal $b_1$ is connected on the one hand to a monostable multivibrator 10 having a width or duration equal to $5T/8$ and on the other hand to one of the inputs of an AND gate 11, the other input of which receives the output signal of the monostable multivibrator 10. Said AND gate supplies a second monostable multivibrator 12 having a width equal to $3T/8$ and the outputs of the two monostable multivibrators 10 and 12 are respectively connected to the two inputs of a NOR logic circuit 13, the output of which is constituted by a terminal $B_2$. Said terminal $B_2$ is then connected to the input of an oscillator 14 which delivers at the output terminal S thereof the clock signal which has been regenerated from the reading signal.

The operation of said device for regenerating the clock signal will now be described with reference to the signal diagram of FIG. 3. In this figure, there is shown at 15 a portion of recording signal in the two-phase code. This portion of signal 15 extends over the successive information intervals $T_1$, $T_2$, ... $T_8$ in which are respectively contained the following binary numerical data : 1-1-1-0-1-0-0-0-

The signal shown at 16 is the reading signal which corresponds to the recording signal 15 after amplification and clipping. As can be observed, the transitions which were located at the center of the information intervals $T_3$, $T_4$and $T_5$are displaced by a timelag of one quarter of the value of the information interval, namely $T/4$, as has been explained with reference to FIG. 1. Said signal 16 is applied to the input terminal E of the regenerating device in accordance with the invention and is differentiated in the circuit 8 in order to produce the signal represented at 17 which delivers one pulse for each transition of the reader signal 16. The signal 17 is then rectified in the circuit 9 and each pulse is shaped so that the signal which appears at the terminal $B_1$ consists of a train of calibrated pulses having a well defined width and leading edge each corresponding to one transition of the reading signal 16.

Figure 3:
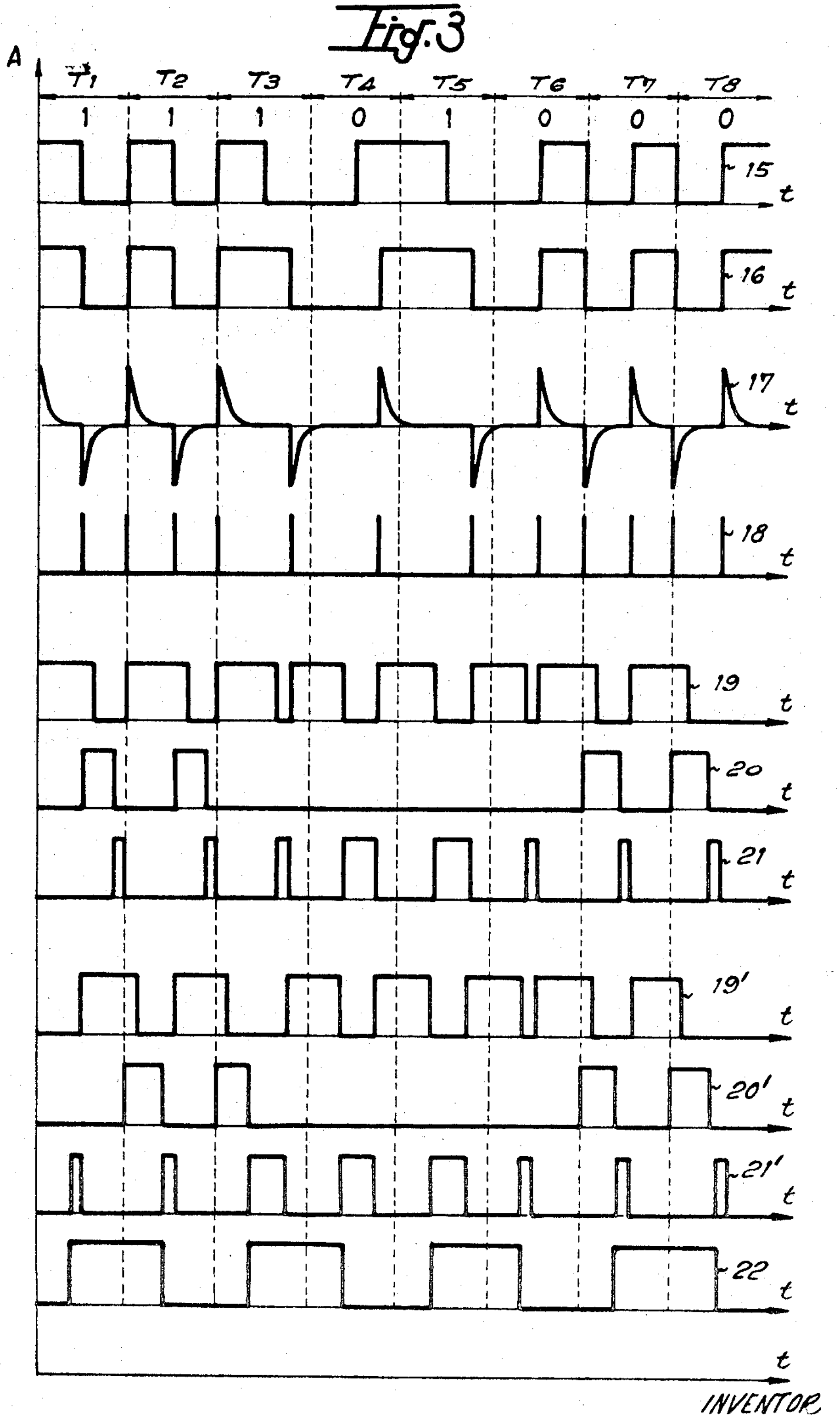
FIG. 3 is a diagram of signals illustrating the operation of said device.

Each pulse of the signal 18 triggers the monostable multivibrator 10 which thus delivers at its output a series of pulses having a width $5T/8$ which are represented at 19 in FIG. 3. The pulses of the signal 18 which are spaced by less than $5T/8$ also trigger the monostable multivibrator 12 by means of the AND gate 11. Said AND gate in fact delivers a trigger signal to the monostable multivibrator 12 only when a pulse 18 is produced whilst the pulse having a width $5T/8$ which is generated by the monostable multivibrator 10 is not yet completed. There is therefore obtained at the output of the multivibrator 12 a series of pulses having a width $3T/8$ which are shown at 20 in FIG. 3.

The output signals 19 and 20 of the two monostable multivibrators 10 and 12 are then applied to the input of the NOR logic circuit 13 which delivers at its output terminal $B_2$ the signal which is represented at 21, that is to say a signal which supplies pulses only in those time intervals during which there is neither any pulse having a width $3T/8$ nor any pulse having a width $5T/8$ at the input.

In fact, the signal 19 can be synchronized with a faulty transition of the signal 16 when the recorded signal is a series of "1" or of "0." However, as soon as a change of information occurs, the signal 19 reverts to the correct phase. The signals represented at 19, 20 and 21 show the process which takes place when the signal 19 is incorrectly synchronized. It is apparent that the first change of information, namely in the present instance the change from "1" to "0" which takes place between the intervals $T_3$ and $T_4$ permits the signal 19 to revert to the correct phase. On the other hand, there are shown at 19', 20' and 21' the signals which correspond respectively to the signals 19, 20 and 21 when the synchronization is correct from the outset.

As is apparent from the figure, the leading edges of the signal 21' are retarded by $7T/8$ or $5T/8$ relative to the transitions of the signal 18 according as they correspond to a transition located at the center of the information interval ($T_1$, $T_2$, $T_6$, $T_7$and $T_8$) or to a transition which had incurred a phase-lag of $T/4$ ($T_3$, $T_4$ and $T_5$). Thus, the leading edges of the signal 21' are all equidistant from each other and uniformly spaced by a period equal to T.

The signal 21' is applied to the input of the oscillator 14 which delivers at the output terminal S of the regenerating device according to the invention a clock signal which is shown at 22. Said clock signal is obtained from the leading edges of the signal 21' and consequently has a strictly stationary phase which makes it possible to reconstruct the recorded information with the minimum error.

Figure 4:
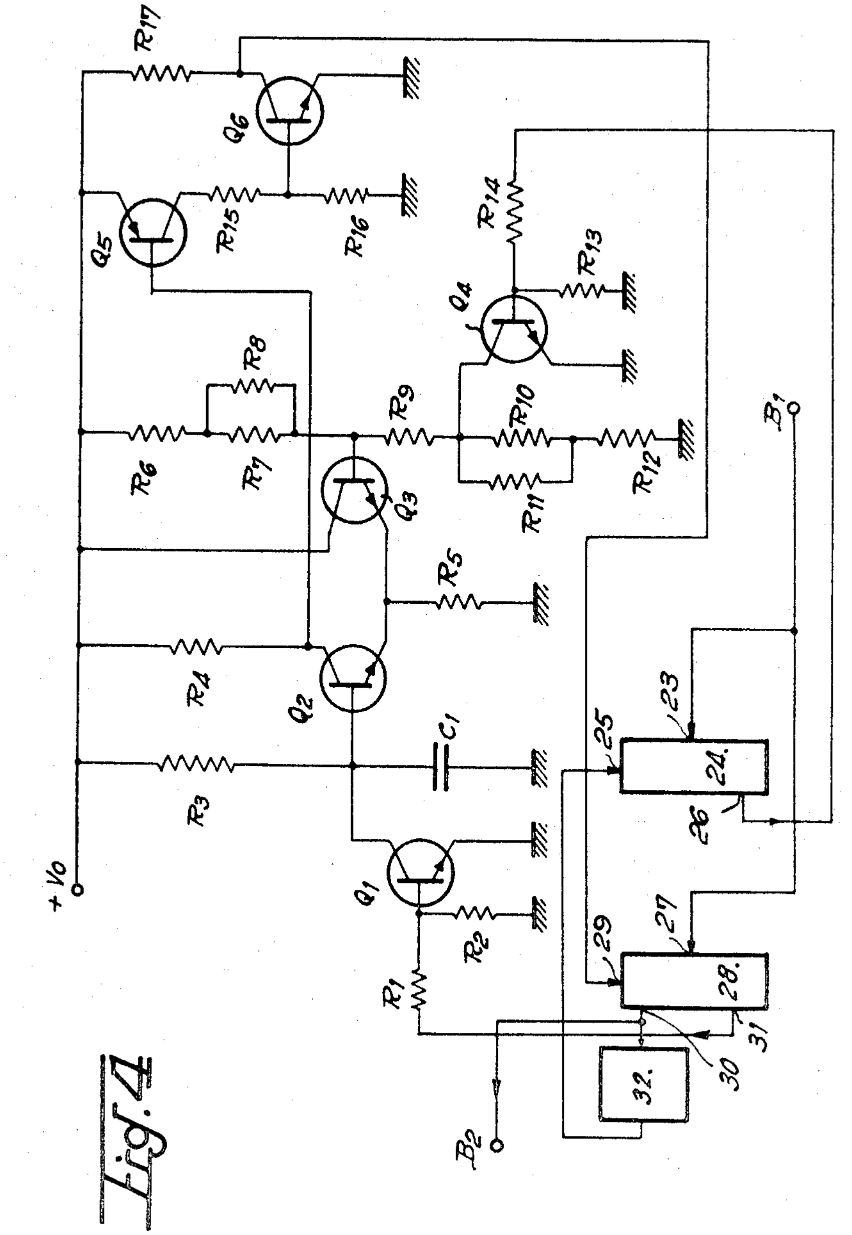
FIG. 4 is a partial block diagram of an alternative embodiment of the regenerating device in accordance with the invention which employs a variable-width monostable device.

Referring now to FIG. 4, there will be described an alternative embodiment of a regenerating device in accordance with the invention wherein the two monostable multivibrators 10 and 12 are combined into a single monostable device of variable width. There is again shown in this figure the input terminal $B_1$ to which is applied a signal such as 18 as well as an output terminal $B_2$ at which is collected a signal such as the signal 21' for regenerating a stationary-phase clock signal.

The terminal $B_1$ is first connected to the input 23 of a first flip-flop 24 having another input 25 and an output 26. The terminal $B_1$ is also connected to the input 27 of a second flip-flop 28 having another input 29 and two outputs 30 and 31.

The first output 30 of the flip-flop 28 is connected on the one hand to the output terminal $B_2$ of the regenerating device and on the other hand to the input of a monostable multivibrator 32, the output of which supplies current directly to the input 25 of the flip-flop 24.

The second output 31 of the flip-flop 28 is connected through a resistor $R_1$ to the base of a grounded-emitter transistor $Q_1$ of the NPN-type. The base of the transistor $Q_1$ is also grounded through a resistor $R_2$ whilst its collector is connected on the one hand to ground through a capacitor $C_1$ and on the other hand through a resistor $R_3$ to a positive bias voltage $+Vo$ which is equal to +5 volts, for example. The collector of the transistor $Q_1$ is also connected directly to the base of a second NPN transistor $Q_2$, the collector of which is connected to the voltage supply $+Vo$ through a resistor $R_4$.

The emitter of the transistor $Q_2$ is directly connected to the emitter of a third transistor $Q_3$ which is also of the NPN-type and both emitters are connected to ground through a common resistor $R_5$. The bias voltage $+Vo$ is directly applied to the collector of said transistor $Q_3$ whilst the base thereof is connected on the one hand to the same voltage supply $+Vo$ through a set of resistors $R_6$, $R_7$ and $R_8$ and on the other hand to ground through a set of resistors $R_9$, $R_{10}$, $R_{11}$ and $R_{12}$.

The junction point between the resistor $R_9$ and the resistor $R_{10}$ is connected to the collector of a fourth grounded-emitter transistor $Q_4$ of the NPN type. The base of said transistor $Q_4$ is connected on the one hand to ground through a resistor $R_{13}$ and on the other hand to the output 26 of the flip-flop 24 through a resistor $R_{14}$.

Finally, the collector of the transistor $Q_2$ is additionally connected to the base of a fifth PNP transistor $A_5$, the emitter of which is connected to the voltage supply $+Vo$ and the collector of which is connected to ground through two series resistors $R_{15}$ and $R_{16}$. The junction point between $R_{15}$ and $R_{16}$ is connected to the base of a sixth and last grounded-emitter transistor $Q_6$ of the NPN type whilst the collector of said transistor is connected to the voltage supply $+Vo$ through a resistor $R_{17}$ and is directly connected to the input 29 of the flip-flop 28.

Figure 5:
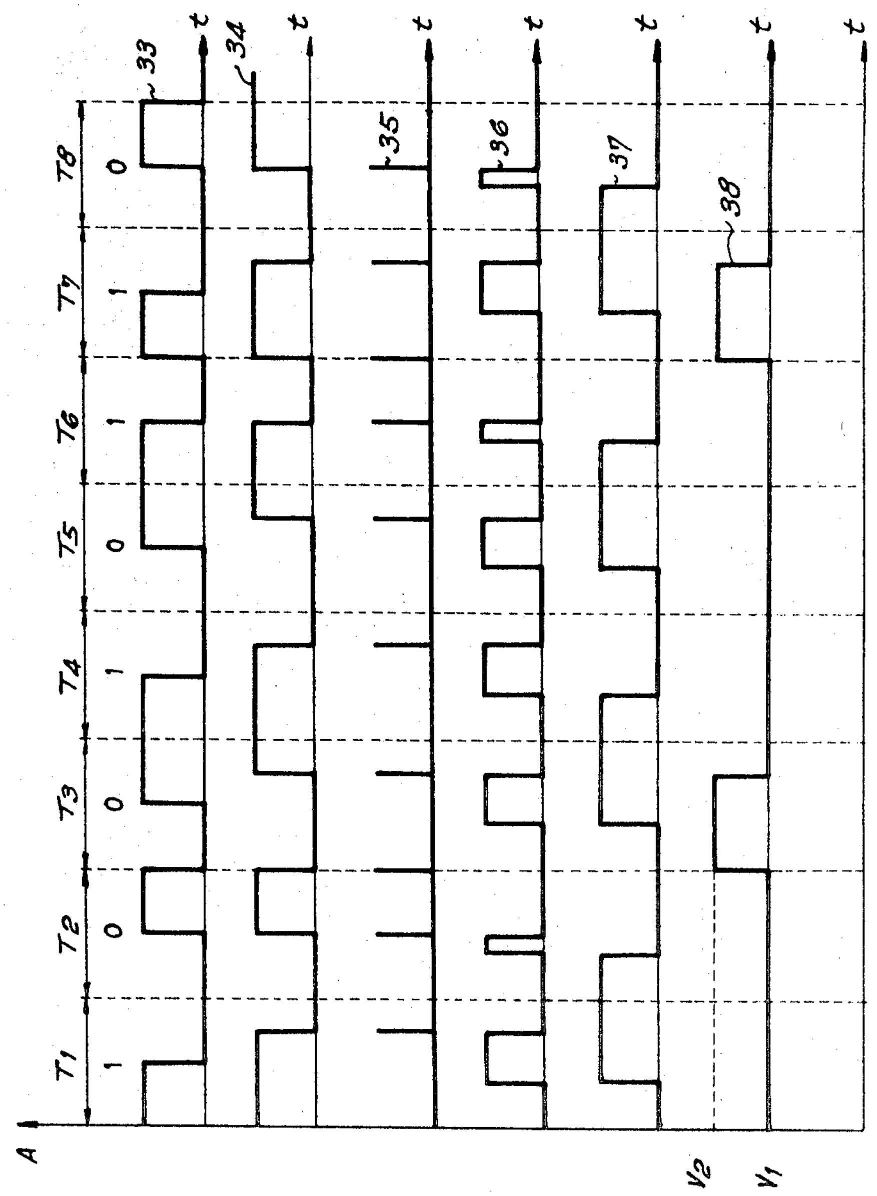
FIG. 5 is a diagram of signals illustrating the operation of said alternative embodiment.

In order to explain the operation of the alternative embodiment of the regenerating device hereinabove described, reference will be made more particularly to the signal diagram of FIG. 5. In this figure, there is shown at 33 another example of recording signal which represents the following binary numerical data: 1–0–0–1–0–1–1–0– The signal shown at 34 is the reading signal corresponding to said recording signal 33 after amplification and clipping.

As in the previous embodiment, a signal 35 which is similar to the signal 18 of FIG. 3 is formed from a reading signal 34 and constituted by a series of calibrated pulses each corresponding to one transition of the reading signal 34 and said signal 35 is applied to the input terminal $B_1$ of the regenerating device.

When no signal 35 appears at the terminal $B_1$, the transistor $Q_1$ is in the conducting state and the transistors $Q_5$ and $Q_6$ are cutoff. The flip-flop 28 is in state "0" and its output 31 is at the voltage $+Vo$, namely +5 volts, for example, with the result that the transistor $Q_1$ is in fact in the conducting state.

When a pulse 35 appears, the flip-flop 28 changes to state "1" and the transistor $Q_1$ is caused to cutoff. In consequence, the capacitor $C_1$ is charged exponentially through the resistor $R_3$ by the bias voltage $+Vo$. When the voltage which appears at the base of the transistor $Q_2$ attains the potential V of the base of the transistor $Q_3$, the transistor $Q_2$ becomes conducting as well as the transistors $Q_5$ and $Q_6$. At the moment when the collector of $Q_6$ changes to the low state, the flip-flop 28 is reset to state "0" and the transistor $Q_1$ again becomes conducting. The time-duration of the monostable circuit thus formed is dependent on the potential V of the base of $Q_3$ and two potentials are possible depending on whether the transistor $Q_4$ is conducting or cutoff. In fact, when $Q_4$ is conducting, the potential V is determined by the bridge of resistors $R_6$ to $R_9$ whereas, when $Q_4$ is cutoff, said potential is determined by the bridge of resistors $R_6$ to $R_{12}$.

The state of the transistor $Q_4$ is controlled by the flip-flop 24. When no pulses 35 are present, the flip-flop 24 is in state "0" and the output 26 of said flip-flop is at +5 volts so that the transistor $Q_4$ is conducting. The potential V is then at a value $V_1$ which corresponds to the width of the shortest monostable circuit, namely $5T/8$.

When a pulse 35 appears, the flip-flop 24 changes to state "1" at the same time as the flip-flop 28. However, when it changes to state "1," the flip-flop 28 triggers the monostable circuit 32 at the output 30 and said circuit in turn produces a pulse at the input 25 of the flip-flop 24. This pulse inhibits the action of the pulse 35 at the input 23, with the result that the flip-flop is reset to state "0."

When a pulse 35 again appears whilst the flip-flop 28 is already in state "1," the action produced on the input 23 of the flip-flop 34 is not inhibited by a reset signal at the other input 25. In this case, the transistor $Q_4$ is cutoff and the base of $Q_3$ assumes the value $V_2$ corresponding to the width of the longest monostable circuit, namely $7T18$.

Thus, when two pulses 35 are spaced by at least $5T/8$, the width of the monostable device is equal to $7T/8$ whereas, when two pulses 35 are spaced by an interval of more than $5T/8$, the length of the monostable device remains equal to $5T/8$. The leading edges of the signal which appears at the output terminal $B_2$ of the regenerating device and which is represented in FIG. 5 at 36 are therefore all in equidistant relation and spaced by a period equal to T. The leading edges of said signal 36 permit the regeneration of a stationary-phase clock signal as represented at 37 whilst there are shown at 38 the variations in the base potential V of the transistor $Q_3$ between the two values $V_1$ and $V_2$ corresponding respectively to the two widths $5T/8$ and $7T/8$ of the variable-width monostable device.

There will now be described another alternative embodiment of a regenerating device in accordance with the invention, reference being now made to FIG. 6. In this alternative form, the variable-width monostable device is replaced by a scaling circuit to which clock pulses are supplied, thereby preventing any possibility of drift in the widths of the monostable device.

Figure 6:
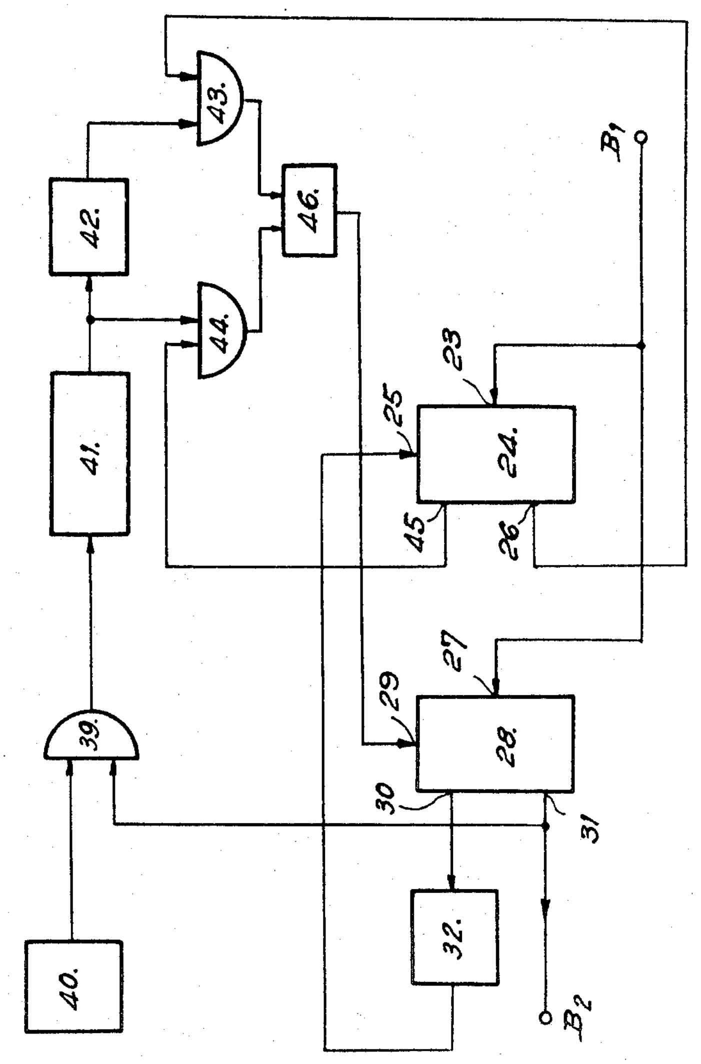
FIG. 6 is a block diagram of another embodiment of the device in accordance with the invention which employs a scaling circuit.

There is again shown in FIG. 6 the input terminal $B_1$ to which is applied a signal such as 18 or 35 as well as the output terminal $B_2$ at which is collected a signal such as 21' or 36. There are also shown the two flip-flops 24 and 28 as well as the monostable circuit 32 for resetting the flip-flop 24.

The output 31 of the flip-flop 28 is connected on the one hand to the terminal $B_2$ and on the other hand to one of the inputs of an AND gate 39 and clock pulses delivered by an oscillator 40 are applied to the other input of said gate.

The output of the gate 39 is connected to the input of a first scaling circuit 41 in series with a second scaling circuit 42. The output of the scaling circuit 42 is connected to one of the inputs of an AND gate 43, the other input of which is connected to the first output 26 of the flip-flop 24 whilst the junction point between the scaling circuit 41 and the scaling circuit 42 is connected to one of the inputs of an AND gate 44, the other input of which is connected to the second output 45 of the flip-flop 24. Finally, the outputs of the two AND gates 43 and 44 are connected to an OR gate 46 which supplies the input 29 of the flip-flop 28.

The operation of this alternative embodiment of the regenerating device in accordance with the invention is as follows:

It will be assumed by way of example that the duration of the information interval T is equal to 80 micro seconds and the clock frequency is equal to 1 megacycle per second. The systems which make use of magnetic recorders can very often deliver a clock signal of this type but it will be assumed for explanatory purposes that said clock signal is delivered by a separate oscillator 40 as illustrated in the figure.

When a pulse such as the pulse 35 appears at the input terminal $B_1$, the two flip-flops 24 and 28 change to state "1." The reversal of the flip-flop 28 resets the flip-flop 24 to state "0" by means of the monostable circuit 32 and opens the AND gate 39. The clock pulses delivered by the oscillator 40 are then applied to the scaling circuit 41 which counts 50 pulses in 50 microseconds. If, during this time, no other pulse 35 appears at the terminal $B_1$, the flip-flop 24 remains in state "0," with the result that the gate 44 is open and the gate 43 is closed. The counting pulse which is supplied by the scaling circuit 41 is then transmitted via the gate 44 and the gate 46 to the input 29 of the flip-flop 28 which is thus reset to state "0."

If, on the contrary, a pulse 35 appears during the period of 50 microseconds, said pulse sets the flip-flop 24 to state "1." In consequence, the gate 44 is closed and counting of clock pulses therefore proceeds up to 70 microseconds inasmuch as the scaling circuit 42 counts 20 pulses. At the end of the 70 microseconds and since the gate 43 is open, the counting pulse is transmitted via said gate to the flip-flop 28 which is thus reset to state "0."

In consequence and as in the previous embodiment, when two pulses 35 are spaced by an interval which is greater than $5T/8$, the time-delay is equal to 50 microseconds or $5T/8$ whereas, when two pulses 35 are spaced by an interval which is less than $5T/8$, the time-delay is equal to 70 microseconds, namely $7T/8$. There is thus obtained at the output terminal $B_2$ of the regenerating device a signal such as 36 having leading edges which permit the regeneration of a stationarv-phase clock signal irrespective of the variations in recorded information.

It is in any case to be understood that the modes of execution of the invention as described in the foregoing have been given solely by way of example without any implied limitation and that a large number of modifications may accordingly be contemplated without thereby departing either from the scope or the spirit of the invention.

What I claim is:

1. A method of regeneration of a clock signal as applicable to systems for recording numerical information signals on a moving magnetic medium which employs a recording code of the "self-synchronizing" type or in other words a code which serves to regenerate the clock signal from the reading signal, characterized in that said method consists in subjecting the reading signal to a time-delay equal to $\tau$ when there is no transition at the center of the information interval whose duration is T and to a time-delay equal to $\tau+T/4$ when there is a transition at the center of the information interval, $\tau$ being smaller than $3T/4$ and preferably equal to $5T8$, whereby to allow generation of a clock signal free of phase distortion due to changes in state of the recorded numerical information.

2. A recording system for the practical application of the method according to claim 1, characterized in that said system is provided with a device for regenerating the clock signal which comprises in combination a differentiator to which the amplified and clipped reading signal is applied at the input, said differentiator being connected in series with a pulse rectifying and shaping circuit which delivers a calibrated pulse in respect of each transition of the reading signal, the output of said circuit being connected on the one hand to the input of a first monostable multivibrator having a width equal to $5T/8$ and on the other hand to one of the inputs of an AND gate which receives at its other input the output signal of the first monostable multivibrator, said AND gate being intended to feed a second monostable multivibrator having a width $3T/8$ and the output signals of the two monostable multivibrators are respectively applied to the two inputs of a NOR logic circuit which supplies an oscillator for generating the clock signal.

3. A recording system according to claim 2, characterized in that the two monostable multivibrators are combined into a signal monostable device having a variable width, the output of said device being coupled directly with the oscillator which generates the clock signal.

4. A recording system according to claim 3, characterized in that the variable-width monostable device is replaced by a scaling circuit to which are applied clock pulses of predetermined frequency delivered by a separate oscillator.

5. The method of claim 1 wherein certain transitions of said reading signal result in a production of a pulse of duration equal to $\tau$, including the steps of producing a first pulse of duration equal to $\tau+T/4$ in response to certain of the transitions of said reading signal, producing a second pulse of time duration equal to $\tau$ in response to time coincidence of a transition of the reading signal and said first pulse, producing a third pulse in response to absence of both the first and second pulses and generating a clock signal having transitions in constant phase relation to the initiation of said third pulses.

6. In a system for recording and playing back numerical information signals on a moving magnetic medium which employs a recording code of the "self-synchronizing" type and more particularly a code which is usable for regenerating the clock signal from the reading signal, apparatus for regenerating such a clock signal while eliminating phase changes in the clock signal regenerated, resulting from data changes in the reading signal, comprising the combination:

- means for modifying the waveform of the reading signal to produce a modified wave form having a fixed phase relationship to the zero crossing points of the reading signal waveform and a phase relation with wave fronts of the recording signal originally applied to the moving magnetic medium, which varies depending on the presence or absence of information changes;
- means for subjecting the modified waveform to a time delay equal to $\tau$ when there is no reading signal transition at the center of the information interval whose duration is T and to a time delay equal to $\tau+T/4$ when there is a transition at the center of the information interval, wherein $\tau$ is smaller than $3T/4$ and preferably equal to $5T/8$; and
- means responsive to said last-mentioned means for producing a clock signal.